United States Patent [19]

Inoue

[11] Patent Number: 4,471,197
[45] Date of Patent: Sep. 11, 1984

[54] METHOD OF AND ARRANGEMENT FOR PREVENTING UNCONTROLLED OSCILLATIONS OF ELECTRODE WIRE IN ELECTROEROSION MACHINING APPARATUS

[75] Inventor: Kiyoshi Inoue, Tokyo, Japan

[73] Assignee: Inoue-Japax Research Incorporated, Yokohama, Japan

[21] Appl. No.: 356,297

[22] Filed: Mar. 10, 1982

[30] Foreign Application Priority Data

Mar. 13, 1981 [JP] Japan .................. 56-35419

[51] Int. Cl.³ .................................................. B23P 1/08
[52] U.S. Cl. .............................. 219/69 M; 219/69 V; 219/69 W
[58] Field of Search ............ 219/69 M, 69 W, 69 E, 219/69 V, 69 S, 69 R; 204/129.6, 129.7

[56] References Cited

U.S. PATENT DOCUMENTS 4,121,080 10/1978 Janicke ..................... 219/69 W
4,329,241 5/1982 Massart .

FOREIGN PATENT DOCUMENTS 54-0109698 8/1979 Japan .................. 219/69 W
55-0164425 12/1980 Japan .................. 219/69 W
2087988 6/1982 United Kingdom .
2087989 6/1982 United Kingdom .
0474417 9/1975 U.S.S.R. ............. 219/69 W

OTHER PUBLICATIONS

Page 963 of McGraw-Hill Dictionary of Scientific & Technical Terms, Published 1974.

Primary Examiner—M. H. Paschall
Attorney, Agent, or Firm—Karl F. Ross; Herbert Dubno

[57] ABSTRACT

Uncontrolled transverse mechanical oscillations of an electrode wire in the traveling-wire electroerosion machining apparatus are effectively and efficiently prevented by provision of a novel assembly comprising a mass of magnetic fluid retained in a pair of magnetic pole pieces and disposed in a straight line path defined between a pair of machining wire guide and support members to accommodate the traveling electrode wire. A magnetic field is established between the pole pieces to actuate the magnetic fluid, thereby damping uncontrolled oscillations as caused in the traveling electrode wire.

26 Claims, 5 Drawing Figures

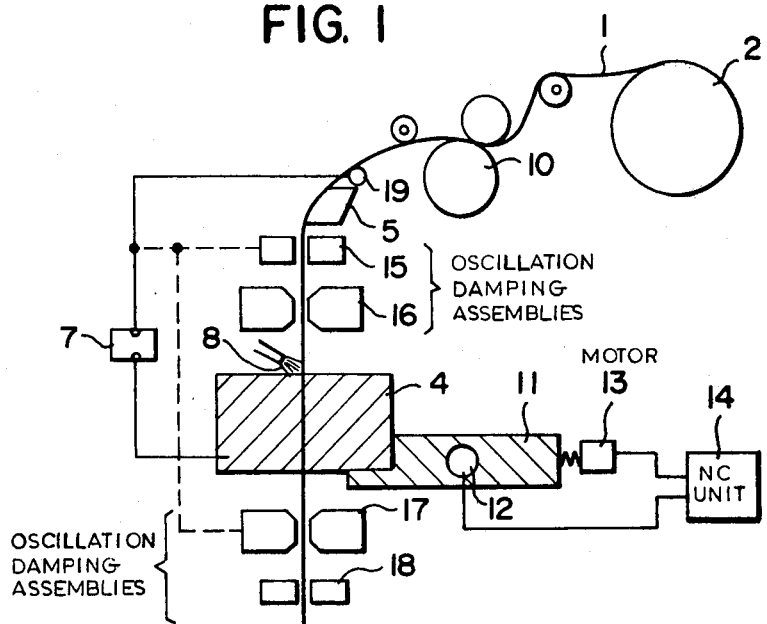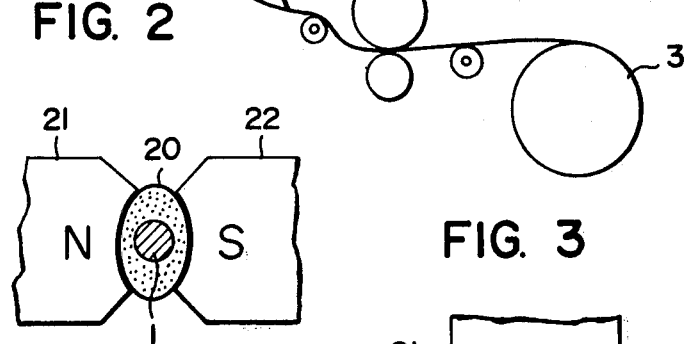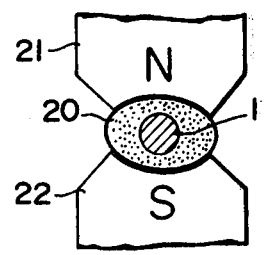

METHOD OF AND ARRANGEMENT FOR PREVENTING UNCONTROLLED OSCILLATIONS OF ELECTRODE WIRE IN ELECTROEROSION MACHINING APPARATUS

FIELD OF THE INVENTION

The present invention relates to traveling-wire electroerosion machining in general and is concerned particularly with a method of preventing uncontrolled oscillations of the electrode wire traveling between a pair of machine wire guide and support members in an electroerosion machining apparatus.

BACKGROUND OF THE INVENTION

In a traveling-wire electroerosion machine, a thin wire, ribbon or tape, all referred to herein as "wire", is dispensed from a supply means such as a wire spool and collected into a takeup means which may also be a spool. In the path of wire travel, a pair of machining wire guide and support members are commonly provided to define therebetween a straight line path through which the electrode wire is to axially travel for electroerosively cutting a portion of a work piece located in the straight line path and flushed with a liquid machining medium such as water liquid controlled as to its conductivity or dielectricity. The electrode wire is typically composed of an electrically conductive material, e.g. of a metal such as copper or an alloy such as brass and its thickness is typically 0.1 to 1 mm. Machining feed means is also commonly provided to displace the workpiece relative to the straight line path or the axis of the traveling electrode wire transversely thereto along a predetermined feed path or machining trajectory to advance electroerosive cutting in the workpiece so that a cut of a shape corresponding to the feed path is eventually formed in the workpiece.

In conventional devices of this genre, there may take place uncontrolled transverse oscillations of the electrode wire traversing the workpiece along the straight line path between the aforementioned wire guide and support means. The occurrence of mechanical oscillations may have many causes such as, for example, the pulsation of the erosion current, the non-continuous motion of the workpiece typically incrementally fed relative to the electrode wire, and/or the impulsive character of the pressure generated in the machining zone. It has been found that these uncontrolled transverse oscillations of the traveling wire in the cutting region have a significant influence on the cutting accuracy of the electroerosion machining process. Furthermore, the uncontrolled wire oscillations tend to cause short-circuiting across the narrow cutting gap and may lead to wire breakage.

In my U.S. Pat. No. 4,205,213 issued May 27, 1980 and my prior U.S. Pat. application Ser. No. 60,346 filed July 25, 1979, (now U.S. Pat. No. 4,321,450) it has also been pointed out that transverse mechanical oscillations of the traveling wire can be positively produced and, when produced in a controlled manner by using an external vibration source, can surprisingly yield a markedly increased electroerosion removal rate without materially reducing the machining accuracy. Here again, it should be noted that any components of the oscillations in generated in an uncontrolled manner are undesirable.

OBJECTS OF THE INVENTION

It is accordingly a principal object of the present invention to provide a novel, effective and efficient method of preventing uncontrolled oscillations of the traveling electrode wire in an electroerosion machining apparatus.

Another object of the invention is to provide a new wire electrode oscillation damping arrangement which is relatively simple and economical, and readily adapted to the existing traveling-wire electroerosion machines.

SUMMARY OF THE INVENTION

In accordance with the present invention, in a first aspect thereof, there is provided a method of preventing uncontrolled transverse mechanical oscillations of an electrode wire axially traveling between a pair of machining wire guide and support members along a straight line path defined thereby for electroerosively cutting a portion of a workpiece located in the path, which method comprises: passing the traveling wire through a mass of magnetic fluid retained between a pair of magnetic pole pieces and disposed in the path between the said portion of the workpiece and one of the guide and support members; and establishing a magnetic field between the pole pieces to actuate the magnetic fluid, thereby damping uncontrolled mechanical oscillations when caused in the traveling electrode wire.

The invention also provides, in a second aspect thereof, an arrangement for preventing uncontrolled oscillations of a traveling electrode wire in an electroerosion machining apparatus having a pair of machining wire guide and support members for defining therebetween a straight line path through which the electrode wire is to axially travel for electroerosively cutting a portion of a workpiece located in the path, which arrangement comprises: a pair of spacedly juxtaposed magnetic pole pieces for retaining therebetween a mass of magnetic fluid in the said path between the said portion of the workpiece and one of the guide and support members and for passing the traveling electrode wire through the magnetic fluid; and means for establishing a magnetic field between the pole pieces to actuate the magnetic fluid, thereby damping uncontrolled mechanical oscillations when caused in the traveling electrode wire.

The magnetic fluid may be a conventional liquid suspension of ferromagnetic or magnetizable particles, e.g. iron powder or a finely divided ferrite and is well known to increase its viscosity under a strong magnetic field.

Preferably, a plurality of such masses of magnetic fluid are disposed at locations spaced apart from one another along the said path between the support and guide members, thus between the said portion and the one and/or the other of the members, and each of the masses is retained between such pole pieces between which such a magnetic field is established. Then, the pole pieces retaining one of the masses of magnetic fluid in one side of the said portion of the workpiece are, preferably, juxtaposed in a direction substantially orthogonal to the direction in which the pole pieces retaining another mass in the same or opposite side are juxtaposed, although it is also possible that the pole pieces disposed between the said portion and one of the guide and support members are juxtaposed in a direction substantially parallel to the direction in which the pole pieces between the said portion and the other of the guide and support members are juxtaposed. In the latter case or when a single mass of the magnetic fluid is used, means is preferably provided for angularly displacing the respective pair of pole pieces retaining a said mass about the said path so as to maintain the direction of juxtaposition of the pole pieces to be substantially orthogonal to a plane defined by the said path which is advanced relative to the workpiece in a machining feed displacement.

The means for establishing a magnetic field may either be a permanent magnet or an electromagnet. A control circuit is advantageously coupled with an energizing circuit for the electromagnet and may be responsive to signals from a machining feed means for displacing the workpiece relative to the said path along a predetermined machine feed path or trajectory so that the intensity of the magnetic fields is controlled in accordance with the shapes of successive portions of the machining feed path.

Further, the magnetic fluid may advantageously contain particles of an electrically conductive material such as an iron powder which is also ferromagnetic, and the electroerosive machining current may be applied to the electrode wire via the magnetic fluid. In this manner, a wire oscillation damping arrangement which serves also as a machining current conductor is provided.

BRIEF DESCRIPTION OF THE DRAWING

These and other objects and features of the present invention as well as advantages thereof will become more readily apparent from the following description of certain preferred embodiments thereof made with reference to the accompanying drawing in which:

FIG. 1 is a side view diagrammatically illustrating a traveling-wire electroerosion machining arrangement incorporating a wire oscillation damping arrangement according to the invention;

FIGS. 2 and 3 are top views of two oscillation damping units in FIG. 1, arranged in one preferred form;

SPECIFIC DESCRIPTION

Figure 4:
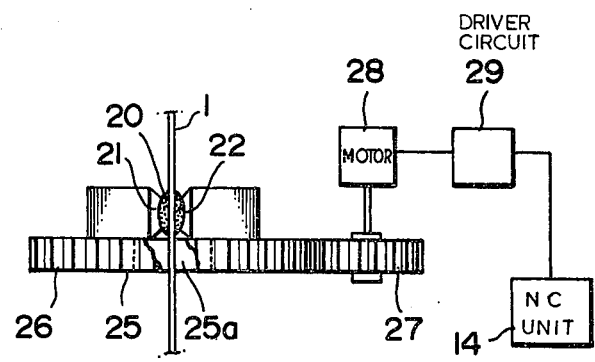
FIG. 4 is a side view diagrammatically illustrating a rotatable wire oscillation damping unit embodying the present invention.

Referring now to FIG. 1, there is shown a continuous electrode wire 1 which extends from a supply reel 2 to a takeup reel 3. A workpiece 4 is disposed in a machining zone flooded with a machining liquid medium, e.g. a distilled water liquid, and provided between a pair of machining wire guide and support members 5 and 6. The members 5, 6 provide a straight line path through which the electrode wire 1 dispensed from the supply spool 2 is advanced axially for electroerosively cutting a portion of the workpiece 4 located in the path while an electrical machining current is passed between the traveling electrode wire 1 and the workpiece 4 from a power supply 7. The machining liquid medium is flushed into the machining zone from one or more nozzles 8. The electrode wire 1 is continuously dispensed from the supply reel 2, advanced through the machining zone and collected onto the takeup reel 3 by a traction drive unit 9 arranged between the downstream-side machining guide member 6 and the takeup reel 3. An appropriate tension required to allow the wire 1 to travel while tightly stretched across the machining guide members 5 and 6 is produced by a braking drive unit 10 arranged between the supply reel 2 and the upstream-side guide member 5. The workpiece 4 is carried on a worktable 11 driven by a pair of motors 12 and 13 which constitute the machining feed unit. A command source 14, e.g. an NC unit, provides the motors 12 and 13 with drive signals to displace the worktable 11 in the direction of X-, and y-axes, respectively so that the workpiece 4 is displaced relative to the traveling electrode wire 1 along a programmed machining path or cutting trajectory in the x-y plane. The electrode wire 1 may be, and customarily is, composed of copper or a copper alloy such as brass which is nonmagnetic.

In the conventional traveling-wire electroerosion machining arrangement described, despite the provision of the wire-tensioning assembly 9 and 10, there may occur transverse mechanical oscillation of the wire 1 traversing the workpiece 4 between the machine guide and support members 5 and 6. These oscillations take place in an uncontrolled manner due, for example, to the pulsating characteristics of the erosion current, the non-continuous motion of the workpiece, the irregular flow characteristics of the flushing liquid and/or the pulsating character of the pressure generated in the machining zone current and become particularly conspicuous when cutting is performed at a corner of the programmed cutting path. It will be apparent that these uncontrolled mechanical oscillations seriously affect the machining accuracy that can be achieved by the electroerosion machining process. Furthermore, the uncontrolled wire oscillations tend to cause short-circuiting across the narrow machining gap and quite often lead to wire breakage.

The arrangement shown accordingly incorporates one or more wire oscillation damping assemblies according to the invention. In FIG. 1 four such assemblies 15–18 are shown. Each assembly, 15, 16, 17, 18, comprises, as shown in enlarged views in FIGS. 2 and 3, a mass of magnetic fluid 20 retained between a pair of pole pieces 21 and 22 and disposed in the aforementioned straight line path to accomodate therein the electrode wire 1 traveling between the machining guide members 5 and 6. The magnetic fluid 20 is constituted by a liquid or colloidal suspension of ferromagnetic or magnetizable fine particles which may be composed of iron (e.g. magnetite) or a ferrite as is well known in the magnetic engineering art. The liquid may be mineral oil such as kerosene or spindle oil. The pole pieces 21 and 22 may be a pair of spacedly juxtaposed end portions of a U- or C-shaped permanent magnetic or electromagnet which establishes an appropriate magnetic field to actuate the magnetic fluid 20 and cause it to be sufficiently viscous to hold the electrode wire 1 against lateral mechanical oscillations. Under the magnetic field the magnetic fluid retains its colloidal nature and remains semi-fluid or semi-solid to allow the electrode wire 1 smoothly or with an extremely low friction to pass therethrough. It is, of course, essential here for the electrode wire 1 not to be magnetically susceptible as in the case with common copper and brass wires so that the magnetized particles in the fluid 20 may not magnetically adhere to the passing electrode 1.

Referring further to FIG. 1, while the electroerosion machining current from the power supply 7 is shown as applied to the electrode wire 1 via a separate conductive roller 19 as is conventional alternatively one or more oscillation damping assemblies 15, 16, 17, 18 can serve also as a highly advantageous conductor to the traveling electrode wire 1 when the magnetic fluid 20 is adapted to contain electrically conductive ferromagnetic particles such as iron powder or to incorporate such conductive particles in addition to the ferromagnetic but nonconductive particles such as finely divided ferrite particles. Preferably, two or more assemblies 15-18 when used are electrically connected to the common terminals of the machining power supply 7 via respective conducting leads as shown by broken lines.

While four assemblies 15-18 are shown in FIG. 1, only one or two may be used. It will be apparent that each assembly should have a pair of pole pieces 21 and 22 spacedly juxtaposed across the mass of magnetic fluid 20 in a direction essentially perpendicular to the axis of the electrode wire 1 traveling through the mass 20. It has been found that the arrangement is particularly effective to damp the components of transverse wire oscillations which lie about in the plane in which the pole pieces are juxtaposed. Thus, to remove all directional components of wire oscillations, it is found desirable that two pairs of the pole pieces 21 and 22, for example, in assemblies 15 and 16 disposed on one same side of the workpiece 4 or in assemblies 16 and 17 disposed respectively on two opposite sides of the workpiece 4 be arranged, as can be seen from FIGS. 2 and 3, such that the pole pieces 21 and 22 in one pair are juxtaposed in a direction substantially orthogonal to the direction in which the pole pieces 21 and 22 in the other pair are juxtaposed. In other words, a plane defined by the juxtaposed pole pieces 21 and 22 in one pair and the axis of the electrode wire 1 should be substantially orthogonal to a plane defined by the juxtaposed pole pieces 21 and 22 in the other pair and the axis of the electrode wire 1. In this case, it is convenient and advisable to make the direction of juxtaposition of pole pieces 21 and 22 in one pair in parallel to the x-axis and to make the direction of the juxtaposition of pole pieces 21 and 22 the other pair in parallel with the y-axis in the x-y plane in which the workpiece 4 is displaced relative to the electrode wire 1 by the machining feed drive assembly 11-14.

It is also possible and advisable to selectively damp the particular directional component of lateral mechanical oscillations of the traveling electrode wire. Thus, one or two or more assemblies 15, 16, 17, 18 may be arranged such that the pair of pole pieces of a single assembly or the pole pieces in all assemblies are juxtaposed parallel to a given direction. In this connection, is should be noted that in the usual machining requirement, the component of lateral wire oscillations transverse or normal to the cutting direction is particularly harmful to the cutting accuracy since it tends to cause undesirable broadening of the groove cut. Accordingly, if the cutting trajectory involves changes in the cutting direction from place to place, it is desirable that the position of the pole pieces 21 and 22 be altered to maintain the direction of their mutual juxtaposition always normal to the cutting direction.

Figure 5:
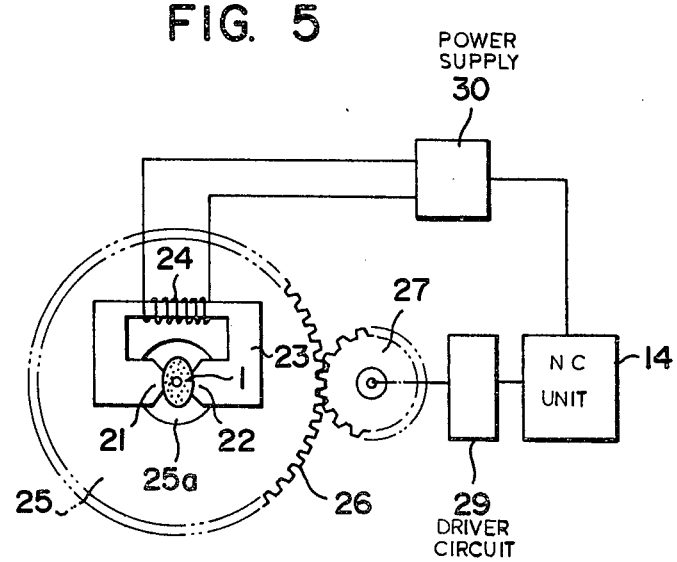
FIG. 5 is a top view of the unit showing in FIG. 4, including a control circuit for the field-generating electro-magnet, shown in a block form.

FIGS. 4 and 5 show a modified oscillation damping assembly in which the pole pieces 21 and 22 retaining therebetween the mass of magnetic fluid 20 which accomodates the traveling electrode wire 1 can be angularly displaced about the axis of the traveling wire 1. The pole pieces 21 and 22 may be mutually juxtaposed end portions of a field generating member 23, e.g. a C- or U-shaped permanent magnet or, as shown in FIG. 5, an electromagnet having a coil 24 wound thereon. The member 23 is shown as securely carried on a rotary disk 25 having an opening 25a in which the traveling wire 1 is freely passed through the mass of magnetic fluid 20. The disk 25 is formed on its periphery with a gear 26 which is in mesh with a gear 27 rotated by a motor 28. A driver circuit 29 for the motor 28 applies rotary drive signals to turn the disk 25 about the traveling electrode wire 1. The command source 1, shown in FIG. 1, is here designed to furnish also the driver circuit 29 with command signals to turn by a commanded angle such that the direction in which the pole pieces 21 and 22 are juxtaposed is maintained to be always normal to the cutting direction, or the direction of advance of the workpiece 4 relative to the axis of the traveling electrode wire 1.

In FIG. 5 the coil 24 for activating the electromagnet 23 is also shown as being energized by a power supply 30 in response to command signals from the machine-feed command source 14. As noted previously, there is a particular geometry, e.g. a corner portion, on a given programmed cutting path or machining trajectory in which the occurrence of adverse mechanical oscillations of the traveling wire is particularly pronounced or their adverse effects on the cutting accuracy and machining performance are markedly accentuated. The power supply 30 is accordingly adapted to variably control the intensity of the magnetic field established between the pole pieces 21 and 22 in accordance with shapes of successive portions of the programmed cutting trajectory indicated by the command source 14. Thus, when cutting is performed at a corner portion or the like, the controlled power supply 30 operates to increase the energizing current through the electromagnetic coil 24 and to increase the intensity of the magnetic field, thereby strengthening the oscillation damping action performed by the magnetic fluid 20. It will be apparent that the field intensity control function described may operate in conjunction with the field direction control achieved with the rotary system 25-29 described.

Having thus described the present invention by way of examples of embodiments thereof, given for illustrative purposes only, it will be appreciated that an improved method of preventing uncontrolled oscillations of an electrode wire in an electroerosion machining apparatus as well as novel arrangement therefor is provided. It will be understood that various changes and modifications of the embodiments hereof are possible and are readily apparent to those skilled in the art.

I claim:

1. A method of preventing uncontrolled oscillations of an electrode wire traveling between a pair of spaced apart wire guide and support members axially along a straight-line path defined thereby for electroerosively cutting a portion of a workpiece located in the path between said members, the method comprising the steps of:

disposing at least one wire oscillation damping assembly comprising a mass of magnetic fluid retained between a pair of magnetic pole pieces in said path between said portion and at least one of said guide and support members;

passing the traveling electrode wire through the mass of magnetic fluid of the damping assembly; and establishing a magnetic field between said pole pieces to actuate said magnetic fluid, thereby damping uncontrolled mechanical oscillations when caused in said traveling electrode wire.

2. A method as defined in claim 1 wherein a plurality of such assemblies are disposed at locations spaced apart from one another along said path between said portion and at least one of said members.

3. A method as defined in claim 2 wherein the pole pieces of at least one said damping assembly are juxtaposed in a direction substantially orthogonal to the direction in which the pole pieces of at least one other of said damping assemblies are juxtaposed.

4. A method as defined in claim 2 wherein the pole pieces disposed between said portion and one of the members are juxtaposed in a direction substantially orthogonal to the direction in which the pole pieces between said portion and the other of the members are juxtaposed.

5. A method as defined in claim 2 wherein the pole pieces disposed between said portion and one of the members are juxtaposed in a direction substantially parallel to the direction in which the pole pieces between said portion and the other of the members are juxtaposed.

6. A method as defined in claim 1 wherein the workpiece is relatively advanced transversely to said path along a predetermined trajectory to advance cutting in said workpiece and the pole pieces of said at least one damping assembly are angularly displaced about said path so as to maintain their predetermined direction of juxtaposition relative to a plane containing said trajectory.

7. A method as defined in claim 6 wherein the pole pieces of at least one of said damping assemblies are angularly displaceable about said path for their direction of juxtaposition to be substantially orthogonal to a plane containing said trajectory.

8. A method as defined in claim 1 wherein said magnetic fluid comprises a liquid suspension of ferromagnetic particles.

9. A method as defined in claim 8 wherein said particles include iron or ferrite.

10. A method as defined in claim 8 wherein said particles, at least in part, include particles of an electrically conductive material.

11. A method as defined in claim 8, claim 9 or claim 10 wherein said liquid is an oil.

12. A method as defined in claim 1, further comprising the step of applying an electric machining current for electroerosively cutting said workpiece to said electrode wire via said magnetic fluid.

13. A method as defined in claim 1 wherein said workpiece is relatively advanced along a predetermined trajectory and the intensity of said magnetic field is controlled in accordance with the shapes of portions of said trajectory.

14. A traveling-wire electroerosion machining apparatus, comprising:
a pair of spaced apart wire guide and support members for defining therebetween a straight-line path along which the electrode wire is to axially travel for electroerosively cutting a portion of a workpiece located in said path;
at least one wire oscillation damping assembly disposed in said path between said portion and at least one of said guide and support members and comprising a mass of magnetic fluid retained between a pair of magnetic pole pieces and adapted to accept the electrode wire traveling therethrough along said path; and
means for establishing a magnetic fluid between said pole pieces to actuate said magnetic fluid, thereby damping uncontrolled mechanical oscillations when caused in said traveling electrode wire.

15. An apparatus as defined in claim 14, comprising plurality of such damping assemblies disposed at locations spaced apart from one another along said path between said portion and at least one of said members.

16. An apparatus as defined in claim 15 wherein the pole pieces of at least one said damping assembly are juxtaposed in a direction substantially orthogonal to the direction in which the pole pieces of at least one other of said damping assemblies are juxtaposed.

17. An apparatus as defined in claim 15 wherein the pole pieces disposed between said portion and one of the members are juxtaposed in a direction substantially orthogonal to the direction in which the pole pieces between said portion and the other of the members are juxtaposed.

18. An apparatus as defined in claim 15 wherein the pole pieces disposed between said portion and one of the members are juxtaposed in a direction substantially parallel to the direction in which the pole pieces between said portion and the other of the members are juxtaposed.

19. An apparatus as defined in claim 14, comprising machining feed means for relatively advancing said workpiece transversely to said path along a predetermined cutting trajectory to advance cutting in said workpiece, and means associated with said machining feed means for angularly displacing the pole pieces of said at least one assembly about said path so as to maintain their predetermined direction of juxtaposition relative to a plane containing said trajectory.

20. An apparatus as defined in claim 19 wherein the means associated with said machining feed means are arranged for angularly displacing the pole pieces of said at least one assembly about said path so as to maintain their direction of juxtaposition to be substantially orthogonal to a plane containing said trajectory.

21. An apparatus as defined in claim 14 wherein said magnetic fluid comprises a liquid suspension of ferromagnetic particles.

22. An apparatus as defined in claim 21 wherein said particles include particles of iron or ferrite.

23. An apparatus as defined in claim 21, wherein said particles, at least in part, include particles of an electrically conductive material.

24. An apparatus as defined in claim 21 wherein said liquid is an oil.

25. An apparatus as defined in claim 23, further comprising a conductor for applying an electroerosion machining current to said electrode wire via said magnetic fluid.

26. An apparatus as defined in claim 19, further comprising means associated with said machining feed means for controlling the intensity of said magnetic field in accordance with the respective shapes of the portions of said trajectory.

* * * * *